Aug. 25, 1931.    S. LE F. VARVEL    1,820,512
CARBURETOR
Filed Aug. 24, 1928
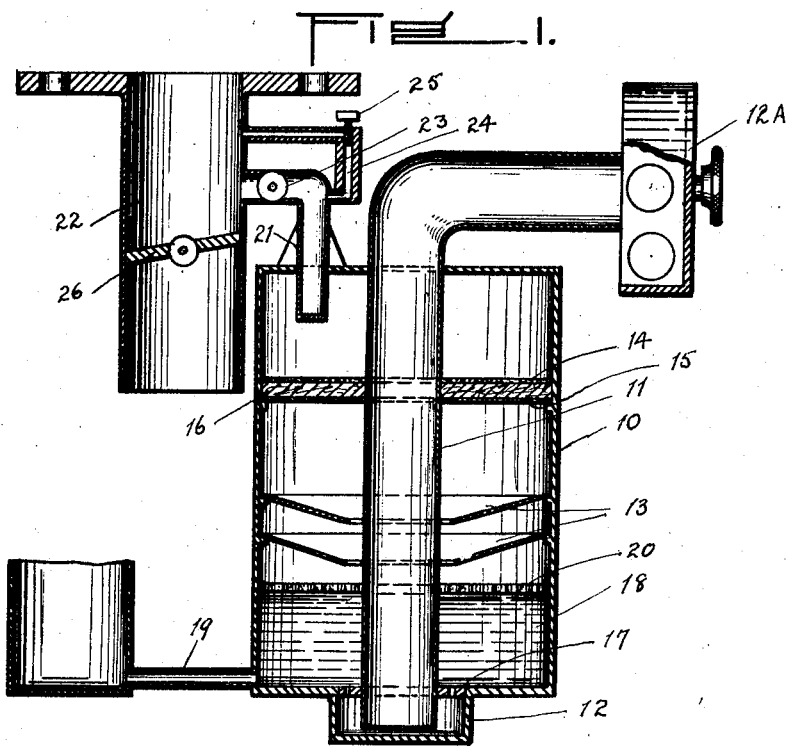
INVENTOR:
Sidney Le Fevre Varvel
BY: Reege, Boyer & Bakelar
ATTORNEYS.

Patented Aug. 25, 1931

1,820,512

UNITED STATES PATENT OFFICE

SIDNEY LE FEVRE VARVEL, OF BEROWRA, NEW SOUTH WALES, AUSTRALIA

CARBURETOR

Application filed August 24, 1928. Serial No. 301,876.

This invention relates to an improved carburetor in which the main supply of air is drawn through a layer of liquid fuel of constant depth and is filtered before it passes into a mixing chamber connected with the engine manifold.

In the accompanying drawings:—

Fig. 1 is a sectional elevation of the device;

Fig. 2 is a plan of the top plate of the well.

A main vaporizing chamber 10 is fitted with a centrally positioned air inlet tube 11 of relatively large diameter which opens into a well 12 in the bottom of the chamber.

The air tube inlet is fitted with an adjustable rotary air valve 12A controlled at will by the operator and preferably from the dashboard of a vehicle fitted with the carburetor.

Detachable metal baffle plates 13 in the form of inverted truncated cones are inserted in the chamber 10. A space is left between the inner edge of each plate 13 and the pipe 11, and above the baffle plates is fitted a removable fuel filter which consists of upper and lower perforated metal plates 14, 15 and an intermediate layer 16 of felt.

A perforated metal plate 17 fitted about the outlet end of the air tube 11 forms a cap for the well 12.

Liquid fuel, indicated by reference number 18, is maintained at a constant level in the chamber 10 by means of a pipe 19 connected with a float chamber of ordinary construction, and to prevent undue splashing of the liquid fuel a perforated cork float 20 is inserted in the chamber 10.

From the top of chamber 10 a pipe 21 of small diameter and perforated at its inlet end opens into a mixing chamber 22 which is adapted to be connected with the engine manifold.

An adjustable gas valve 23 is mounted in gas pipe 21 in order that the amount of fuel delivered by the pipe may be controlled at will, and an idling passage or bypass 24 provided with a regulating screw 25 is fitted in the pipe 21 behind the valve 23.

A butterfly valve 26 is mounted in the mixing chamber 22 below the outlet of pipe 21 to control the admission of extra air.

In operation, air is drawn through the air valve 12A into the air tube 11 and passes into the well 12 from which it emerges as a series of streams which rise through the layer of liquid fuel and become saturated with fuel. Globules of liquid carried up by the air streams strike the baffle plates 13 and are returned to the body of liquid fuel. The saturated air carrying some fuel mist passes through the spaces between the baffles 13 and the pipe 11, is filtered by the filter 14—16 and passes in gaseous form through the gas pipe 21 into the mixing chamber 22 where it is mixed with the desired quantity of extra air.

I claim:

1. A carburetor, comprising in combination, a vaporizing chamber, a well in the bottom of the chamber, a perforated disk cover for the well, an air inlet tube of relatively large diameter extending vertically through the chamber into the well, a manually controllable air valve on the outer end of the tube, a splash-preventing perforated cork-float in the chamber, inverted truncated cone-shaped baffle plates mounted in the chamber above the float, spaced perforated metal plates mounted in the chamber above the baffle plates, a straining layer of felt between the perforated metal plates, an outlet pipe in the top of the chamber, and a float-controlled fuel supply chamber in communication with the vaporizing chamber near its base.

2. A carburetor, comprising in combination, a vaporizing chamber having a well in its base and a perforated disk cover for the well, a splash-preventing perforated cork-float in the chamber, inverted truncated cone-shaped baffle plates mounted on the walls of the chamber above the float, spaced perforated metal plates mounted on the walls of the chamber above the baffle plates, a felt layer between the metal plates, a vertical air-inlet tube of relatively large diameter extending through the plates cork-float and well cover into the well, an air-control valve on the tube, an outlet pipe of relatively small diameter in the top of the chamber, a bypass in the outlet pipe, a valve in the outlet pipe beyond the bypass, and a float-controlled fuel chamber in communication with the base of the vaporizing chamber.

In testimony whereof I have affixed my signature.

SIDNEY LE FEVRE VARVEL.